United States Patent [19]

Berding et al.

[11] Patent Number: 6,046,889
[45] Date of Patent: Apr. 4, 2000

[54] DISK DRIVE HAVING A PIVOT ASSEMBLY WHICH DEFINES A KNIFE EDGE FACING IN A DIRECTION PERPENDICULAR TO THE LONGITUDINAL AXIS OF AN ACTUATOR ARM

[75] Inventors: Keith R. Berding; Jon Garbarino, both of San Jose, Calif.

[73] Assignee: Western Digital Corporation, Irvine, Calif.

[21] Appl. No.: 09/160,366

[22] Filed: Sep. 24, 1998

[51] Int. Cl.⁷ ....................................................... G11B 5/55
[52] U.S. Cl. ............................................ 360/106; 360/104
[58] Field of Search ..................................... 360/104, 105, 360/106, 97.01, 99.01

[56] References Cited

U.S. PATENT DOCUMENTS

| | | | |
|---|---|---|---|
| 4,170,361 | 10/1979 | Zwicky et al. | 369/251 |
| 4,170,362 | 10/1979 | Zwicky et al. | 369/251 |
| 4,577,248 | 3/1986 | Cantwell | 360/99.04 |
| 4,578,726 | 3/1986 | Boehm et al. | 360/99.01 |
| 4,995,025 | 2/1991 | Schulze . | |
| 5,355,268 | 10/1994 | Schulze . | |

FOREIGN PATENT DOCUMENTS

| | | |
|---|---|---|
| 38 08 134A1 | 9/1989 | Germany . |
| 54-47604 | 4/1979 | Japan . |

*Primary Examiner*—William Klimowicz
*Attorney, Agent, or Firm*—Milad G. Shara

[57] ABSTRACT

A disk drive includes a base, a spindle motor coupled to the base, a disk mounted on the spindle motor, a pivot assembly coupled to the base, and a head stack assembly. The head stack assembly includes an actuator body defining a bore for surrounding the pivot assembly, a supporting surface, and an actuator arm cantilevered from the actuator body and defining a longitudinal axis. The bore defines a pivot axis of the head stack assembly. The pivot assembly includes a stationary member coupled to the base, the stationary member having a length, and a rotatable member positioned on the supporting surface such that the rotatable member is between the stationary member and the supporting surface. The stationary member and the rotatable member define a projecting member and a recessed portion, the projecting member and the recessed portion interacting to allow the head stack assembly to pivot about the pivot axis. The projecting member defines a knife edge extending parallel to the length and facing in a direction substantially perpendicular to the longitudinal axis.

8 Claims, 4 Drawing Sheets

DISK DRIVE HAVING A PIVOT ASSEMBLY WHICH DEFINES A KNIFE EDGE FACING IN A DIRECTION PERPENDICULAR TO THE LONGITUDINAL AXIS OF AN ACTUATOR ARM

BACKGROUND OF THE INVENTION

1. Field of the Invention

This invention relates to hard disk drives. More particularly, this invention relates to a pivot assembly for rotating a head stack assembly of the hard disk drive.

2. Description of the Prior Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of arms projecting parallel to each other and perpendicular to the axis of the bore. The prefabricated head stack assembly also includes head gimbal assemblies that are supported by the arms. Each head gimbal assembly includes a load beam and a head supported by the load beam.

The pivot bearing cartridge typically includes an outer shell, longitudinally spaced-apart ball bearings and an inner shaft with the inner shaft being attached to the base to define an axis of rotation for the rotary actuator. While the pivot bearing cartridge has worked well for its intended purpose, it is relatively expensive due to the cost of the ball bearings. Accordingly, research and development efforts have been expended in efforts to provide a lower-cost alternative to the pivot bearing cartridge.

U.S. Pat. No. 5,355,268 to Schulze ("Schulze") discloses one such lower cost alternative in which a pivot assembly uses knife edge pivot technology. Prior Art FIG. 1 of this application is generally representative of each of the embodiments disclosed in the patent in which the pivot assembly is configured such that a knife edge faces in a direction in line with the longitudinal axis of an actuator arm. With reference to Prior Art FIG. 1, a portion of a head stack assembly and a pivot assembly 117 installed in its bore 102 are shown. The head stack assembly includes an actuator body 100 defining bore 102 and an actuator arm 106. Actuator arm 106 defines a longitudinal axis 108. When the head stack assembly is installed in a disk drive, actuator arm 106 moves in a direction which is primarily radial relative to a recording surface of a disk (not shown). The radial movement of the actuator arm includes movement in an off-track direction 109 relative to a selected track on the recording surface; based on this we define the off-track direction as being perpendicular to longitudinal axis 108.

Pivot assembly 117 includes a stationary member 110 having a recessed portion 104 and a rotatable member 112 attached to a surface of bore 102. Rotatable member 112 includes a projecting member 114 having a knife edge 116. Recessed portion 104 receives knife edge 116 such that rotatable member 112 and hence, the actuator arm, rotates partially relative to the stationary member. In the prior art, knife edge 116 faces in a direction in line with the longitudinal axis 108. In such a configuration, knife edge 116 is in shear and bending relative to recessed portion 104 as actuator arm 106 moves in off-track direction 109 such that the stiffness in the off-track direction is relatively low. Such a low stiffness leads to relatively large amplitude resonance(s) of a head (not shown) coupled to actuator arm 106 at frequencies which are detrimental to the performance of most present day servo systems.

With reference to FIG. 5, a Prior Art plot 500 represents the magnitude of vibrations of the head as a function of frequency. As shown, the plot includes a peak 502 at about 2.7 kHz which has a magnitude of 25 dB. The magnitude is measured relative to an imaginary line 700 which represents an ideal situation in which no vibrations occur. In most present day hard disk drives, the presence of any significant resonances occurring between the frequencies of 1 to 4 kHz may result in instability of the servo system and/or writing and reading off-track. As a result, any significant resonances (i.e., those whose magnitude exceeds about 15 dB relative to imaginary line 700) of the head are preferably located at a resonant frequency of 4 kHz or higher.

SUMMARY OF THE INVENTION

This invention can be regarded as a disk drive including a base, a spindle motor coupled to the base, a disk mounted on the spindle motor, a pivot assembly coupled to the base, and a head stack assembly. The head stack assembly includes an actuator body defining a bore for surrounding the pivot assembly, a supporting surface, and an actuator arm cantilevered from the actuator body and defining a longitudinal axis. The bore defines a pivot axis of the head stack assembly.

The pivot assembly includes a stationary member coupled to the base, the stationary member having a length, and a rotatable member positioned on the supporting surface such that the rotatable member is between the stationary member and the supporting surface. The stationary member and the rotatable member define a projecting member and a recessed portion, the projecting member and the recessed portion interacting to allow the head stack assembly to pivot about the pivot axis. The projecting member defines a knife edge extending parallel to the length and facing in a direction substantially perpendicular to the longitudinal axis.

DETAILED DESCRIPTION OF A PREFERRED EMBODIMENT

Figure 2:
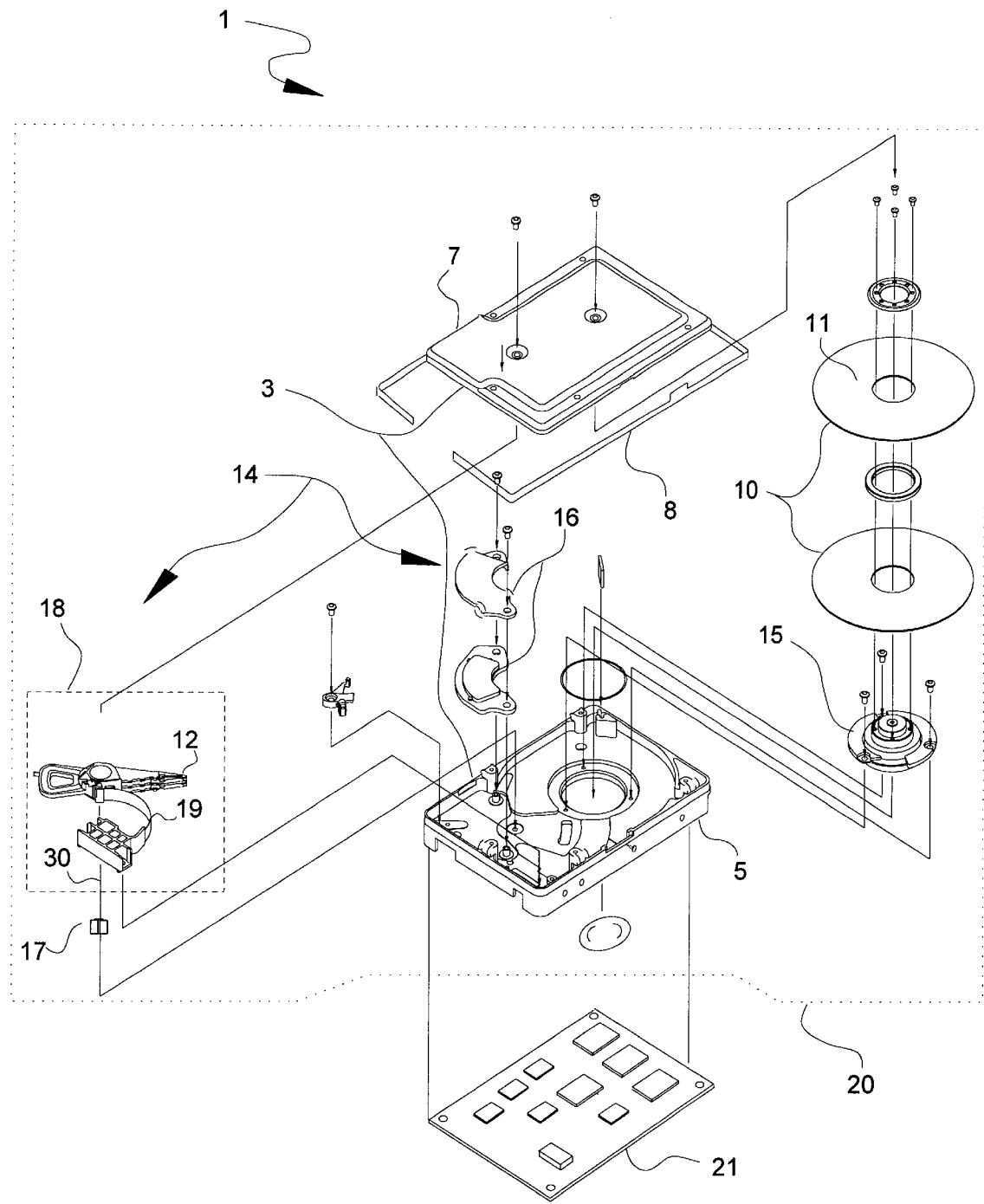
FIG. 2 is an exploded perspective view of a hard disk drive including an embodiment of this invention.

With reference to FIG. 2, a disk drive 1 includes an enclosure 3 comprising a base 5 and a cover 7. Enclosure 3 is sealed to provide a relatively contaminant-free interior for a head disk assembly (HDA) portion 20 of disk drive 1. Suitably, a tape seal 8 is used to seal enclosure 3. Disk drive 1 also includes a printed circuit board assembly 21 which contains the circuitry for processing signals and controlling operations of disk drive 1.

Within its interior, disk drive 1 includes a magnetic disk 10 having a recording surface 11, and includes a magnetic transducer 12. The particular embodiment shown in FIG. 1 includes two disks 10, providing four recording surfaces, and includes four magnetic transducers 12. Disk drive 1 further includes a rotary actuator arrangement generally indicated at 14. A spindle motor 15 causes each disk 10 to spin, preferably at a constant angular velocity. Spindle motor is coupled to base 5.

Rotary actuator arrangement 14 provides for positioning magnetic transducer 12 over a selected area of recording surface 11 of disk 10. Rotary actuator arrangement 14 includes a permanent-magnet arrangement generally indicated at 16, a pivot assembly 17 coupled to base 5, and a head stack assembly 18. Head stack assembly 18 includes a flex circuit assembly 19.

Figure 3:
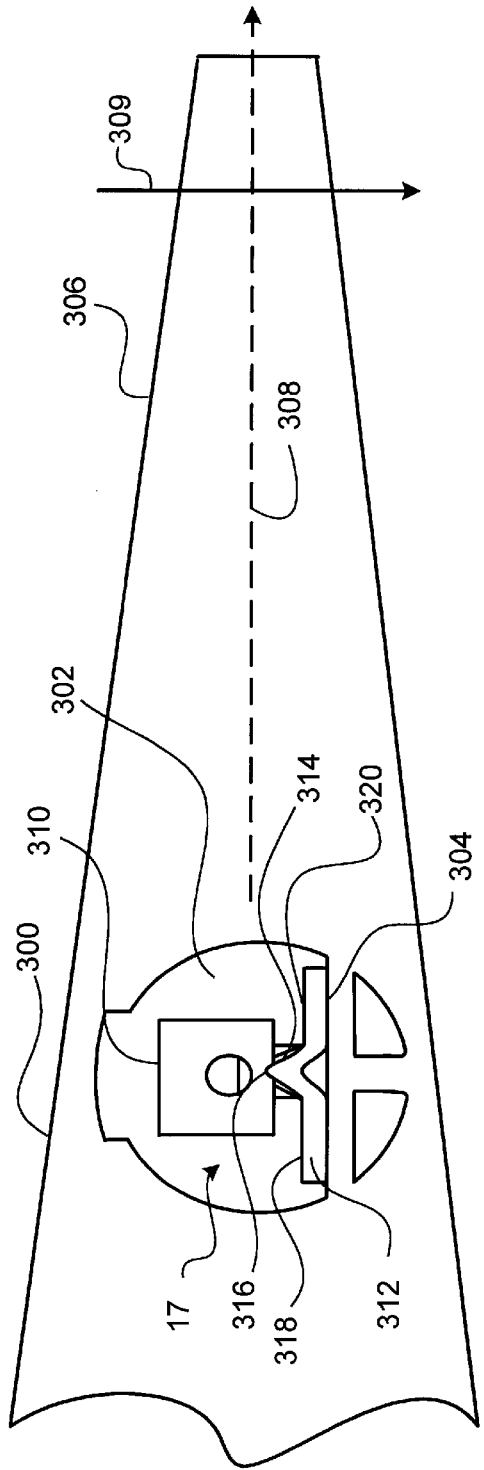
FIG. 3 is a plan view of a portion of a head stack assembly shown in FIG. 2 in which a pivot assembly positioned in its bore has been rotated 90 degrees compared to the Prior Art shown in FIG. 1.

With reference to FIG. 3, head stack assembly 18 includes an actuator body 300 defining a bore 302 for surrounding pivot assembly 17, a supporting surface 304, and an actuator arm 306 cantilevered from the actuator body. Actuator arm 306 defines a longitudinal axis 308. Bore 302 defines a pivot axis 30 (FIG. 2) of the head stack assembly. Pivot assembly 17 includes a stationary member 310 coupled to base 5 (FIG. 2), a rotatable member 312 positioned on supporting surface 304 such that the rotatable member is between stationary member 310 and supporting surface 304. As shown in FIG. 3, supporting surface 304 is a vertical surface. Stationary member 310 and rotatable member 312 define a projecting member 314 and a recessed portion 404 (FIG. 4) such that projecting member 314 and recessed portion 404 interact to allow the head stack assembly to pivot about pivot axis 30 (FIG. 2). Preferably, stationary member 310 includes recessed portion 404 and rotatable member 312 includes projecting member 314. In an alternative embodiment, recessed portion 404 may be formed on rotatable member 312 and projecting member 314 may be formed on stationary member 310.

Continuing with FIG. 3, rotatable member 312 includes a first inner surface 318 and a second inner surface 320 spaced-apart from first inner surface 318 in the direction of longitudinal axis 308. First inner surface 318 and second inner surface 320 define a common vertical plane which is parallel with longitudinal axis 308. Projecting member 314 defines a knife edge 316 extending parallel to a length "L" (FIG. 4) of stationary member 310. Significantly, knife edge 316 faces in a direction perpendicular to longitudinal axis 308 such that the angle between the direction that knife edge 316 faces and longitudinal axis 308 is 90 degrees. In such a configuration, knife edge 316 and recessed portion 404 (FIG. 4) are in compression when a load is applied in an off-track direction 309. In other words, when a load is applied in off-track direction 309, knife edge 316 and recessed portion 404 are not in shear and bending as in the prior art shown in FIG. 1. The compression obtained with the novel configuration shown in FIG. 3 results in significantly greater stiffness in off-track direction 309 compared to the Prior Art shown in FIG. 1. In an alternative embodiment, the preferred 90 degree angle between the direction that knife edge 316 faces and longitudinal axis 308 can vary within a range of plus/minus 40 degrees. In other words, the angle can range from 50 degrees to 130 degrees as measured from longitudinal axis 308 in a clock-wise direction.

Figure 1:
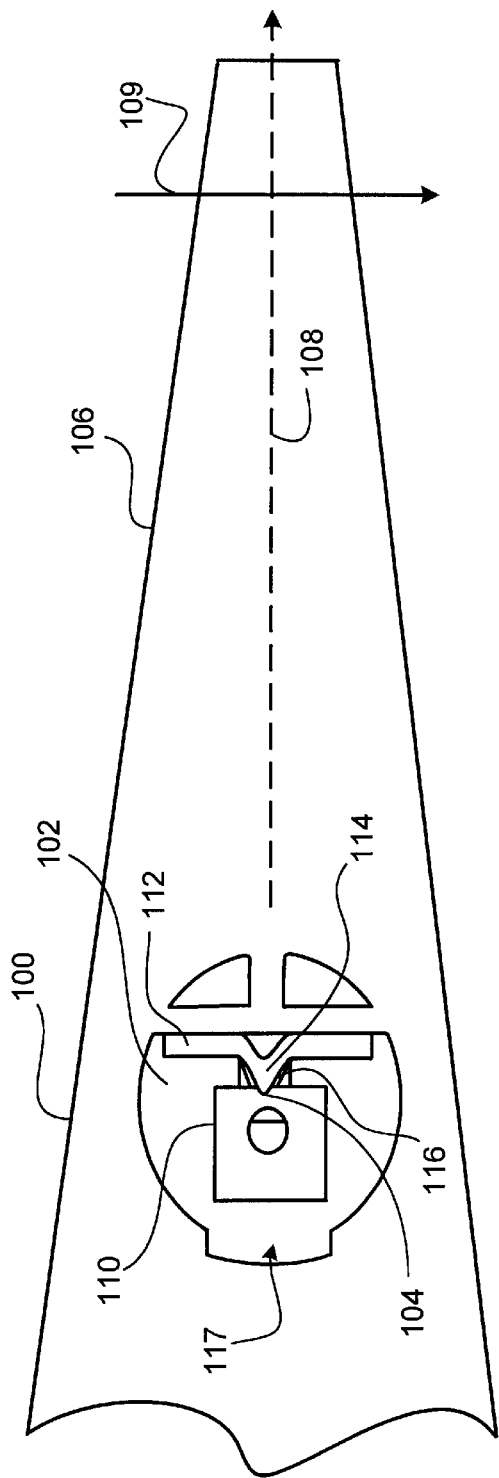
FIG. 1 is a plan view of a portion of a head stack assembly and a pivot assembly positioned in its bore according to the Prior Art.

Preferably, pivot assembly 17 is rotated 90 degrees clockwise relative to the configuration shown in Prior Art FIG. 1 such that knife edge 316 faces in a direction perpendicular to longitudinal axis 308 as shown in FIG. 3. In an alternative embodiment, pivot assembly 17 may be rotated 90 degrees counter-clockwise relative to the configuration shown in Prior Art FIG. 1.

Figure 4:
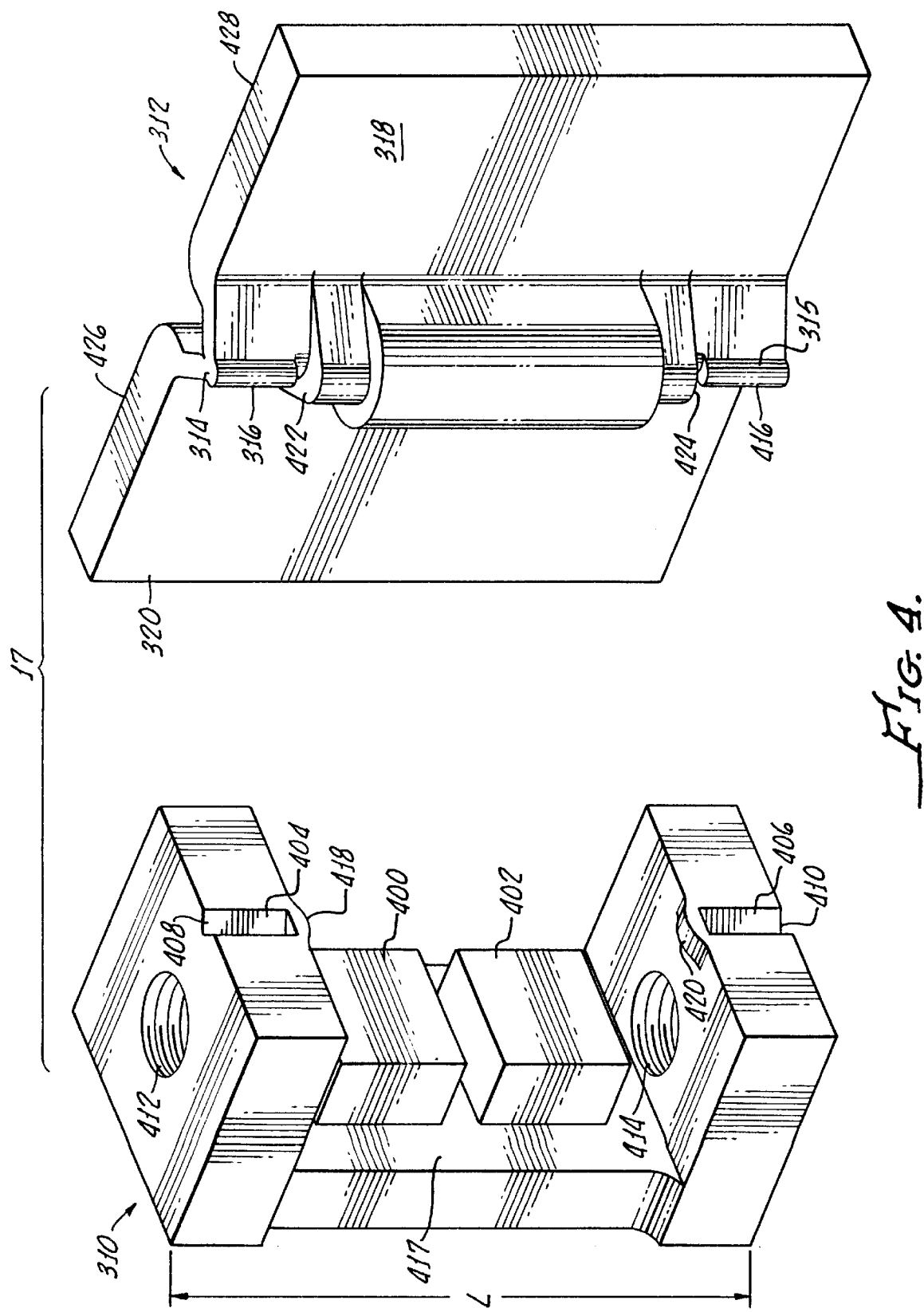
FIG. 4 is an exploded perspective view of a pivot assembly shown in FIG. 2.

With reference to FIG. 4, stationary member 310 includes threaded screw holes 412 and 414 for attaching the stationary member to the enclosure of a disk drive. Stationary member 310 further includes a vertical surface 417, recessed portion 404, a second recessed portion 406 spaced-apart axially from recessed portion 404, a top protrusion 418, and a bottom protrusion 420. Each recessed portion is substantially V-shaped as shown at 408 and 410. Rotatable member 312 includes first inner surface 318, second inner surface 320, first 428 and second 426 outer surfaces for abutting supporting surface 304 (FIG. 3), projecting member 314, a second projecting member 315 spaced-apart axially from projecting member 314, a top ledge 422, and a bottom ledge 424. Projecting members 314 and 315 define respective knife edges 316 and 416. When pivot assembly 17 is installed in bore 302 (FIG. 3) of a head stack assembly, urging means such as magnets 400 and 402 urges projecting members 314 and 315 to press against respective recessed portions 404 and 406 allowing the head stack assembly to rotate about pivot axis 30 (FIG. 2); in addition, top ledge 422 and bottom ledge 424 abut top protrusion 418 and bottom protrusion 420, respectively, to prevent relative axial movement between stationary member 310 and rotatable member 312.

Figure 5:
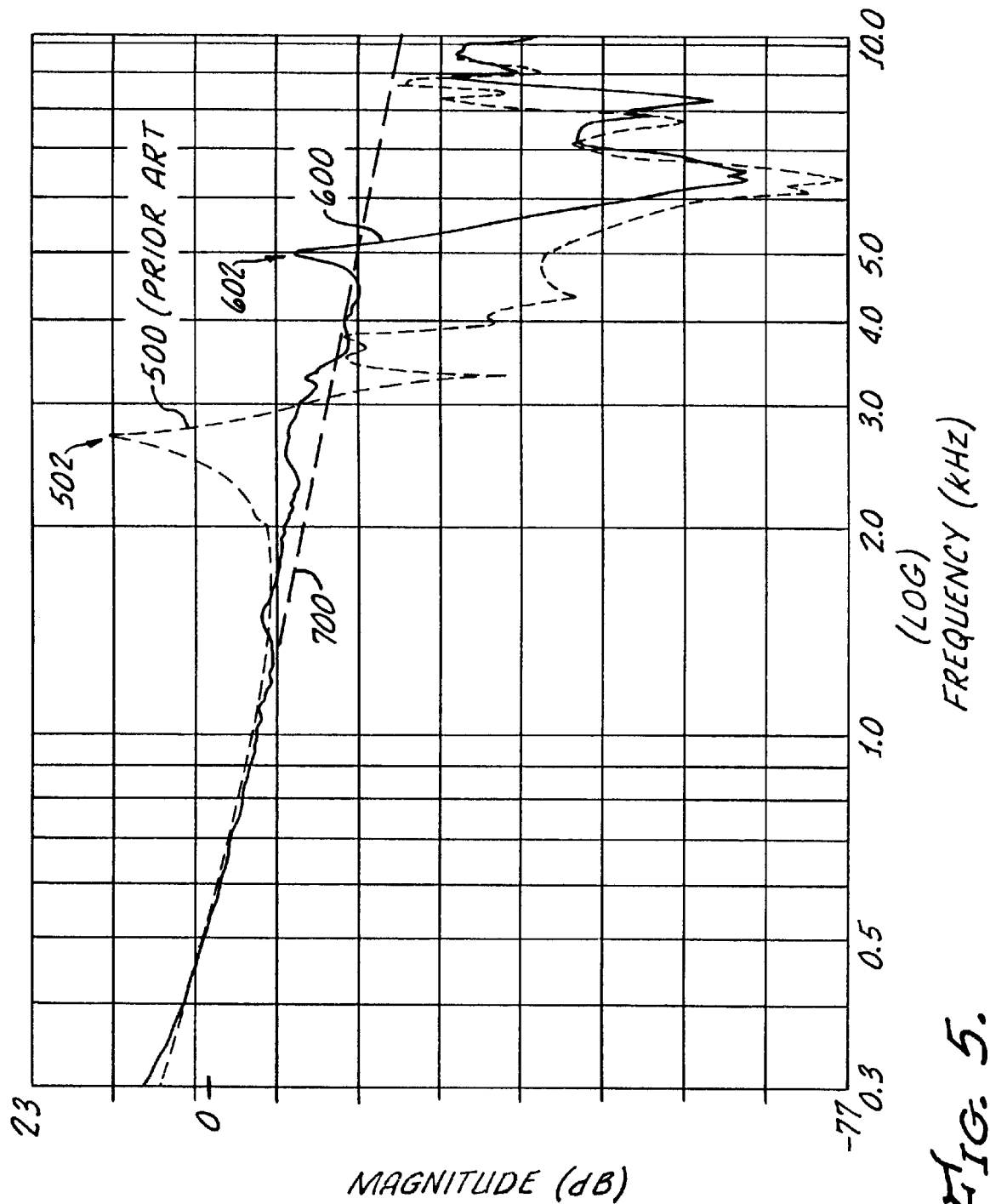
FIG. 5 are plots of frequency responses in which the frequency response exhibited by the Prior Art shown in FIG. 1 is compared with the frequency response exhibited by this invention.

With reference to FIG. 5, plot 600 represents a significantly improved frequency response obtained in accordance with this invention. As shown, a peak 602 has a magnitude of 8 dB at a resonant frequency of 5 kHz. Hence, compared to Prior Art plot 500, the resonant frequency has shifted beyond 4 kHz and its amplitude is significantly smaller.

We claim:

1. A disk drive comprising:

a base;

a spindle motor coupled to the base;

a disk mounted on the spindle motor;

a pivot assembly coupled to the base;

a head stack assembly including:
   an actuator body defining a bore for surrounding the pivot assembly, the bore defining a pivot axis of the head stack assembly;
   a supporting surface;
   an actuator arm cantilevered from the actuator body, the actuator arm defining a longitudinal axis;

the pivot assembly including:

a stationary member coupled to the base, the stationary member having a length;

a rotatable member positioned on the supporting surface such that the rotatable member is between the stationary member and the supporting surface;

the stationary member and the rotatable member defining a projecting member and a recessed portion, the projecting member and the recessed portion interacting to allow the head stack assembly to pivot about the pivot axis, the projecting member defining a knife edge extending parallel to the length and facing in a direction substantially perpendicular to the longitudinal axis.

2. The disk drive of claim 1 further comprising:

urging means for urging the projecting member to press against the recessed portion.

3. The disk drive of claim 2 wherein the urging means includes a plurality of magnets.

4. The disk drive of claim 1 wherein the stationary member defines the recessed portion and the rotatable member defines the projecting member.

5. The disk drive of claim 1 wherein the supporting surface is a vertical surface.

6. The disk drive of claim 1 wherein the rotatable member further comprises:

a first inner surface;

a second inner surface spaced apart from the first inner surface in the direction of the longitudinal axis;

the inner surfaces defining a common vertical plane which is parallel with the longitudinal axis.

7. The disk drive of claim 1 wherein the stationary member and the rotatable member define a second projecting member and a second recessed portion, the projecting members being spaced-apart axially and the recessed portions being spaced-apart axially.

8. The disk drive of claim 7 wherein the recessed portions are substantially V-shaped.

* * * * *